United States Patent [19]

Ohtsu

[11] Patent Number: 4,877,081
[45] Date of Patent: Oct. 31, 1989

[54] AIR-CONDITIONING APPARATUS FOR AUTOMOBILES

[75] Inventor: Eiichi Ohtsu, Katsuta, Japan

[73] Assignee: Hitachi, Ltd., Tokyo, Japan

[21] Appl. No.: 326,069

[22] Filed: Mar. 20, 1989

[30] Foreign Application Priority Data

Mar. 22, 1988 [JP] Japan .................................. 63-67592
Mar. 22, 1988 [JP] Japan .................................. 63-67593

[51] Int. Cl.[4] ............................................. F25B 29/00
[52] U.S. Cl. ........................................ 165/30; 165/43; 62/133; 62/209; 62/229
[58] Field of Search ............... 165/30, 42, 43; 62/133, 62/209, 229

[56] References Cited

U.S. PATENT DOCUMENTS

| 4,325,225 | 4/1982 | Price, II | 62/229 |
| 4,456,166 | 6/1984 | Kagohata | 165/43 |
| 4,539,823 | 9/1985 | Nishi et al. | 62/229 |
| 4,540,040 | 9/1985 | Fukumoto et al. | 62/229 |
| 4,582,124 | 4/1986 | Yoshimi et al. | 165/43 |
| 4,606,197 | 8/1986 | Takahashi et al. | 62/133 |
| 4,646,535 | 3/1987 | Matsuoka et al. | 165/43 |
| 4,649,709 | 3/1987 | Kagohata et al. | 165/43 |
| 4,766,950 | 8/1988 | Yamada et al. | 165/43 |

FOREIGN PATENT DOCUMENTS

| 0041205 | 3/1982 | Japan | 62/209 |
| 57-160709 | 10/1982 | Japan | . |
| 57-175422 | 10/1982 | Japan | . |
| 58-85062 | 5/1983 | Japan | . |
| 59-109527 | 7/1984 | Japan | . |

Primary Examiner—John Ford
Attorney, Agent, or Firm—Fay, Sharpe, Beall, Fagan, Minnich & McKee

[57] ABSTRACT

An air-conditioning apparatus for automobiles comprises a device for detecting the internal air temperature providing the temperature in the automobile cabin, a device for detecting the atmospheric air temperature, a device for setting a target value of the internal air temperature, a device for calculating a target value of the air blowdown temperature from the output signals of the aforementioned three devices, a device for calculating a compensation amount for the compressor capacity from the difference between the target value and the output signal of a device for detecting the actual air blowdown temperature, and a device for controlling the compressor capacity in accordance with the result of the calculation.

12 Claims, 6 Drawing Sheets

AIR-CONDITIONING APPARATUS FOR AUTOMOBILES

BACKGROUND OF THE INVENTION

The present invention relates to an air-conditioning apparatus for automobiles, and more in particular to an automotive air-conditioning apparatus comprising a variable-capacity compressor.

Conventional air-conditioning apparatuses for automobiles of this type comprise a compressor adapted to operate on several percent of the engine torque as a driving source, and the compressor therefore is required to operate without any loss of efficiency in order to improve the drivability and save fuel for the automobiles. As a result, as disclosed in JP-A-58-85062, such conventional apparatuses comprise a sensor for detecting the physical quantities related to thermal loads including the atmospheric temperature, internal temperature or intake air temperature of an evaporator, and the detection value of the sensor is compared with a set value of the physical quantities related to the thermal loads, so that the capacity of the compressor is controlled in accordance with the magnitude of the error therebetween thereby to regulate the cooling capacity.

The above-mentioned conventional apparatuses also comprise, as disclosed in JP-A-57-175422, means for detecting the engine speed or engine load, and with the increase in engine speed or engine load thus detected, the compressor capacity is reduced to a small level thereby to improve the acceleration characteristic.

Further, the conventional apparatuses mentioned above, as disclosed in JP-A-57-160709, comprise means for detecting the outlet air temperature of an evaporator, and the detection value of the detection means is compared with an actual value of the outlet air temperature of the evaporator, so that a servo motor for controlling the capacity of the compressor is driven in forward or reverse direction depending on the magnitude of the error thus detected, whereby the outlet temperature of the evaporator is regulated to adjust the cooling capacity.

JP-A-59-109527, on the other hand, discloses another conventional apparatus comprising at least means for setting a target of internal temperature and means for detecting the internal temperature, in which the basic control value for driving the compressor is calculated in accordance with the output of the internal temperature target setting means and the internal temperature detection means, and the basic control value is compensated in blowdown mode in accordance with the operation of a mode switch adapted to be changed over to any of a plurality of modes thereby to control the compressor capacity at the time of cooling.

The air-conditioning apparatus for automobiles disclosed in JP-A-58-85062, which is controlled on the basis of physical quantities related to thermal loads such as the atmospheric temperature, internal temperature or intake air temperature of an evaporator, fails to take into consideration the fact that the factor affecting the comfort most strongly is the temperature of blowdown air into the cabin, with the result that the cabin temperature is controlled to a predetermined constant level like in a constant-temperature bath but not to a comfortable blowdown temperature.

In the apparatus disclosed in JP-A-57-175422, on the other hand, with the increase in engine speed or load, the output capacity of a compressor is controlled to a low level arbitrarily without due consideration paid to the required cooling capacity, and therefore the difference between the set temperature and the detection temperature is such that even at the time of cool-down requiring a large cooling capacity, the compressor capacity is reduced to a low level, thereby deteriorating the cooling efficiency for a lower comfort.

The apparatus disclosed in JP-A-57-160709 comprises means for detecting a set value of the output temperature of an evaporator with a detection value, and a servo motor is driven in accordance with the magnitude of the error therebetween, so that response is retarded in refrigeration cycles and no appropriate consideration is given to the time delay caused before a change in the outlet temperature of the evaporator. As a consequence of such a control, the compressor capacity is controlled on the basis of an evaporator outlet temperature not reflecting the control result, thus posing the problem of unstable control of the compressor capacity.

According to the apparatus described in JP-A-59-109527 (UM), the compensation amount of the basic control value is determined only at an average value by a predetermined method of calculations based on the blowdown mode. This compensation method, in which the compensation amount is fixed at a range of average values, fails to effect sufficient compensation to attain a comfortable blowdown temperature, with the result that the loss of the cooling capacity is caused, thereby leading to the problems of energy loss and failure to attain a comfortable blowdown temperature.

SUMMARY OF THE INVENTION

Accordingly, a first object of the present invention is to provide an air-conditioning apparatus for automobiles in which the compressor capacity is controlled to regulate the blowdown temperature to a comfortable level.

A second object of the present invention is to provide an air-conditioning apparatus for automobiles in which the compressor is capable of being controlled to minimum capacity.

A third object of the present invention is to provide an air-conditioning apparatus for automobiles in which the compressor is controlled in such a manner as to strike a balance between the internal comfort quality and the automotive acceleration characteristic.

A fourth object of the invention is to provide an air-conditioning apparatus for automobiles in which the compressor capacity is controlled in stable manner in the form of the outlet temperature of an evaporator.

In order to achieve the first object, there is provided according to the present invention an air-conditioning apparatus for automobiles comprising means for detecting the internal air temperature, means for detecting the atmospheric temperature, means for setting an internal air temperature target, means for calculating a compensation amount for the compressor capacity on the basis of output signals from the foregoing three means, means for controlling the compressor capacity on the basis of the output of the calculation means, and means for detecting the temperature of air blowdown into the cabin, in which the calculation means calculates a target blowdown temperature from the output signals of the internal air temperature detection means, the atmospheric air temperature detection means and the internal air temperature target setting means and calculating the compensation amount from the temperature difference between the target blowdown temperature and the output signals of the blowdown temperature detection means.

The control means mentioned above is preferably adapted to control the compressor capacity in predetermined cycles.

The blowdown temperature detection means grasps the present situation of the blowdown temperature and the calculation means determines the compensation amount for the cooling capacity in such a manner that the blowdown temperature coincides with a target blowdown temperature, so that the compressor capacity is controlled on the basis of this compensation amount. As a result, the blowdown air is controlled to a target blowdown temperature thereby to attain a comfortable blowdown temperature.

In the case where the control means controls the compressor capacity in predetermined cycles, the capacity is controlled at regular intervals of time and the delay of heat transfer to the cool air is absorbed, so that the capacity control is effected at such a blowdown temperature as to reflect the previous control result, thus assuring stage control of compressor capacity.

In order to achieve the second object of the invention, there is provided according to the present invention an air-conditioning apparatus for automobiles comprising means for detecting the internal air temperature, means for detecting the atmosphere air temperature, means for setting an internal air temperature target, means for determining a blowdown outlet to be used, means for calculating the compensation amount for the compressor capacity on the basis of the output signals from the aforementioned four means, means for controlling the compressor capacity on the basis of the output of the calculation means, and means for detecting the temperature of air blowdown into the cabin, wherein the calculation means includes means for calculating a target blowdown temperature for each blowdown outlet in response to the output signals from the internal air temperature detection means, the atmospheric air temperature detection means and the internal air temperature target setting means, and means for determining the compensation amount from the temperature difference between the output signal of the blowdown temperature detection means of a blowdown outlet and the lowest target blowdown temperature at the blowdown outlet in use as determined at the blowdown outlet determining means.

The calculation means is for calculating a compensation amount of the compressor capacity from the temperature difference between the output signal of the blowdown temperature detection means at an outlet and the target blowdown temperature at the blowdown outlet in use, and therefore the outlet capacity of the compressor is controlled in such a manner that the blowdown temperature at the blowdown outlet lowest in the target blowdown temperature, provides a target value, thereby making it possible to drive the compressor with a minimum capacity required to maintain all the blowdown outlets at a target temperature.

In order to achieve the third object of the present invention, there is provided an air-conditioning apparatus for automobiles, comprising means for detecting the acceleration, control means for reducing the compressor capacity in response to the output signal of the acceleration detection means, means for detecting the internal air temperature, means for detecting the atmospheric temperature, means for setting an internal air temperature target, and means for detecting the temperature of blowdown into the cabin, wherein the control means calculates a target blowdown temperature from the output signals of the internal air temperature detection means, the atmospheric air temperature detection means and the internal air temperature target setting means, and determines a compensation amount for the compressor capacity on the basis of the temperature difference between the target blowdown temperature and the output signal of the blowdown temperature detection means, so that the compressor capacity is reduced on the basis of the output signal of the acceleration detection means and the compensation amount.

The control means determines a compensation amount with the target blowdown temperature and the output signal of the blowdown temperature detection means as an index of the required cooling capacity, and controls the rate of reduction in the compressor capacity by taking this compensation amount into consideration together with the output signal of the acceleration detection means. In this method of compensation, in the case where the atmospheric temperature is so high that the required cooling capacity is larger than a predetermined value, a compensation amount is determined in such a manner that the cooling of the cabin is emphasized while the acceleration is improved less, thereby assuring a lesser reduction in comfort.

In order to the achieve the fourth object of the present invention, there is provided according to the present invention an air-conditioning apparatus for automobiles comprising air cooling means, means for detecting the air temperature at the outlet of the cooling means, means for calculating a compensation amount for the compressor capacity from the temperature difference between a target temperature of the outlet air of the cooling means and the output signal of the detection means, and control means for controlling the compressor capacity on the basis of the output signal from the calculation means, wherein the control means is adapted to control the compressor capacity in predetermined cycles.

The control means calculates the difference between the air temperature at the outlet of the evaporator and a target temperature a predetermined time after the compressor capacity is controlled in a cycle thereby to adjust the capacity again. As a result, the capacity is adjusted in terms of the temperature at the evaporator outlet reflecting the result of previous capacity control, and therefore unstable control with average or shortage of capacity regulation is prevented.

According to one aspect of the present invention, the compressor output capacity is controlled on the basis of the blowdown temperature most affecting the feeling of the driver and passengers, and therefore the comfort is improved.

According to another aspect of the invention, the compressor is controlled at a required minimum of output capacity in order to set all blowdown outlet temperatures to a comfortable value, and therefore energy consumption of the compressor drain is minimized as required for attaining a comfortable blowdown temperature.

According to still another aspect of the present invention, the blowdown temperature is maintained at a comfortable value by stable control if the capacity is controlled in cycles.

According to a further aspect of the invention, the compressor capacity is controlled by being reduced in order to improved the acceleration characteristic taking the required cooling capacity into account, so that the comfortability and acceleration are balanced in control process.

According to a still further aspect of the invention, the temperature of air at the outlet of the evaporator is controlled in stable manner, and therefore not only the comfortability but also the economy of the power for driving the compressor is improved at the same time.

DESCRIPTION OF THE PREFERRED EMBODIMENTS

An embodiment of the present invention will be explained below with reference to FIGS. 1 to 6.

Figure 1:
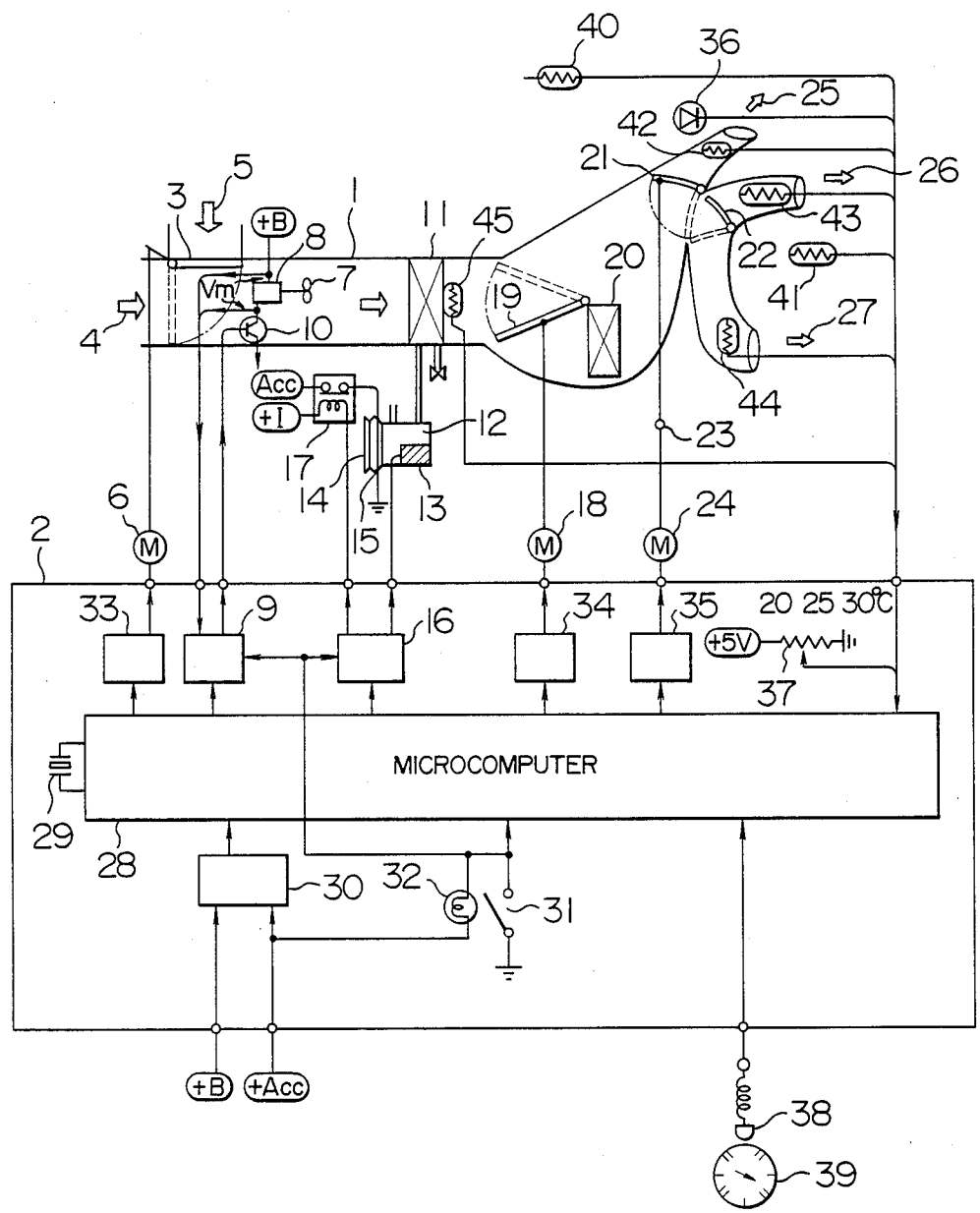
FIG. 1 is a diagram showing schematically a configuration of an air conditioning apparatus for automobiles according to an embodiment of the present invention.

FIG. 1 shows a general configuration of an air-condition apparatus for automobiles according to an embodiment of the present invention. This apparatus comprises a temperature control section 1 and a control circuit section 2.

Reference is had of the temperature control section 1. This temperature control section 1 includes an intake door 3 for making intake adjustments, an internal air intake port 4 and an atmospheric air intake port 5. The air is selected by the intake door 3, and absorbed by way of the intake port 4 or 5. The door 3 is driven by an electrically-operated actuator 6.

The temperature control section 1 also includes a blower 7 making up air supply means. The air introduced from the internal air intake port 4 or the atmospheric air intake port 5 is sent by the blower 7 at a rate controlled by the voltage Vm applied to a motor 8. The power (+B) is supplied from a battery not shown. A blower control circuit 9 compares the voltage Vm across the motor 8 with a target voltage, and the voltage across the motor 8 is controlled to the target voltage by a transistor 10.

An evaporator 11 providing cooling means is installed downstream of the blower 7 for cooling the air sent by the blower 7. The cooling capacity is regulated by controlling the flow rate of a refrigerant by means of a capacity actuator 13 that is part of a capacity-variable compressor 12 of the external control type. The capacity actuator 13 is a solenoid valve capable of changing the opening degree of the refrigerant flow rate control valve by the voltage applied thereto. This applied voltage is used to variably control the vapor pressure of the refrigerant evaporated at the evaporator. The power source for the compressor 12 is an engine not shown. The power to the compressor 12 is interrupted by a magnet clutch 15 integrated between a pulley 14 connected to the engine by a V-belt and the compressor 12.

The power (+Acc) supplied to magnet clutch 15 is interruptable by a relay 17 energized by an instruction given to a compressor control circuit 16.

An air mix door 19 driven by an electrically operated actuator 18 is arranged further downstream of the evaporator 11. The air that has passed through the evaporator 11 is divided by the air mix door 19 into the air portion passed through a heater 20 and the air portion bypassing the heater 20. The heater 20 makes up heating means deriving its heat from the cooling water (about 80° C.) of the engine.

The temperature control device section 1 includes a defroster door 21, a ventilator door 22, a defrosting air blowdown outlet 25, a ventilator blown outlet 26 and a floor blowdown outlet 27. The defroster door 21 and the ventilator door 22 are interlocked by a link 23, and are driven by an electrically-operated actuator 24. Depending on the positions of the defroster door 21 and the ventilator door 22, the distribution of air blown into the cabin from the defroster outlet 25, the ventilator blowdown outlet 26 and the blower outlet 27 is regulated. Blowdowns are of three combinations including an upper mode (UPR) in which all air is blown out from the ventilator blowdown outlet 26, a by-level mode (B/L) in which air is blown out of the ventilator blowdown outlet 26 and the floor blowdown outlet 27, and the lower mode (LWR) for blowing out air from the defroster blowdown outlet 25 and the floor blowdown outlet 27.

Now, the control circuit section 2 will be explained. The control circuit section 2 has the function of control and includes control means, decision means and calculation means as a microcomputer 28 built therein. The microcomputer 28 according to this embodiment has built therein a central processor unit (CPU), a read-only memory (ROM) for storing processing steps (program and constants), a random access memory (RAM) for storing data, an input/output terminal (I/O), an analog-to-digital conversion function (A/D), a given-width pulse output terminal, a given-frequency pulse output terminal, a pulse cycle counting terminal and a predetermined-time interrupt function.

An oscillation terminal of the microcomputer 28 is connected with a crystal oscillator 29 of 1 MHz, and the program proceeds in cycles of one microsecond.

The control circuit section 2 is supplied from a battery not shown with a +B power constantly and a +Acc power at the position "Acc" or "ON" of the key switch of the automobile not shown. When these power are supplied to a power circuit 30, it is converted into a 5V constant voltage by a built-in constant-voltage element to provide a +5V power supply.

Further, the control circuit section, includes a switch 31 for designating the system on and off, and an indicator lamp 32 for the switch 31. When an off signal is supplied from the switch 1 to the blower control circuit 9 and the compressor control circuit 16, each circuit works to stop the motor 8, turning off the magnet clutch 15.

The power actuators 6, 18 and 24 are controlled through the door driving circuits 33, 34 and 35 with a built-in drive IC (such as Toshiba's TA8050).

According to the embodiment under consideration, the apparatus comprises six temperature sensors, a sunlight or sun load sensor 36 and a temperature setting VR 37 providing an internal air temperature target setting means. These voltage signals are connected independently to the A/D terminal of the microcomputer 28, and after being converted into a digital binary data, are used for calculations. The six temperature sensors include an atmospheric air temperature sensor 40 making up means for detecting the atmospheric air temperature, an internal air temperature sensor 41 making up a device mounted within the operation panel or on the ceiling for detecting the internal air temperature, a defroster duct temperature sensor 42 making up means for detecting the temperature of air blowdown into the cabin, a ventilator duct temperature sensor 43, a floor duct temperature sensor 44, and an evaporator outlet temperature sensor 45 making up means for detecting the cooling air temperature.

The apparatus further comprises a vehicle speed sensor 38 which is provided by a sensor of an electromagnetic generation type for producing an AC signal output at a frequency proportional to the revolutional speed of the pinion of a speedometer 39. A signal from the vehicle speed sensor 38 is applied as a period by use of the pulse period calculation function of the microcomputer 28, and subsequently, the reciprocal thereof is used to detect the vehicle speed. The vehicle speed detection means 38 is utilized as acceleration detection means as described later.

The procedure for control at the temperature control section 1 will be explained with reference to the flowcharts of FIGS. 2 to 5 indicating the processes stored in the ROM of the microcomputer 28.

Figure 2:
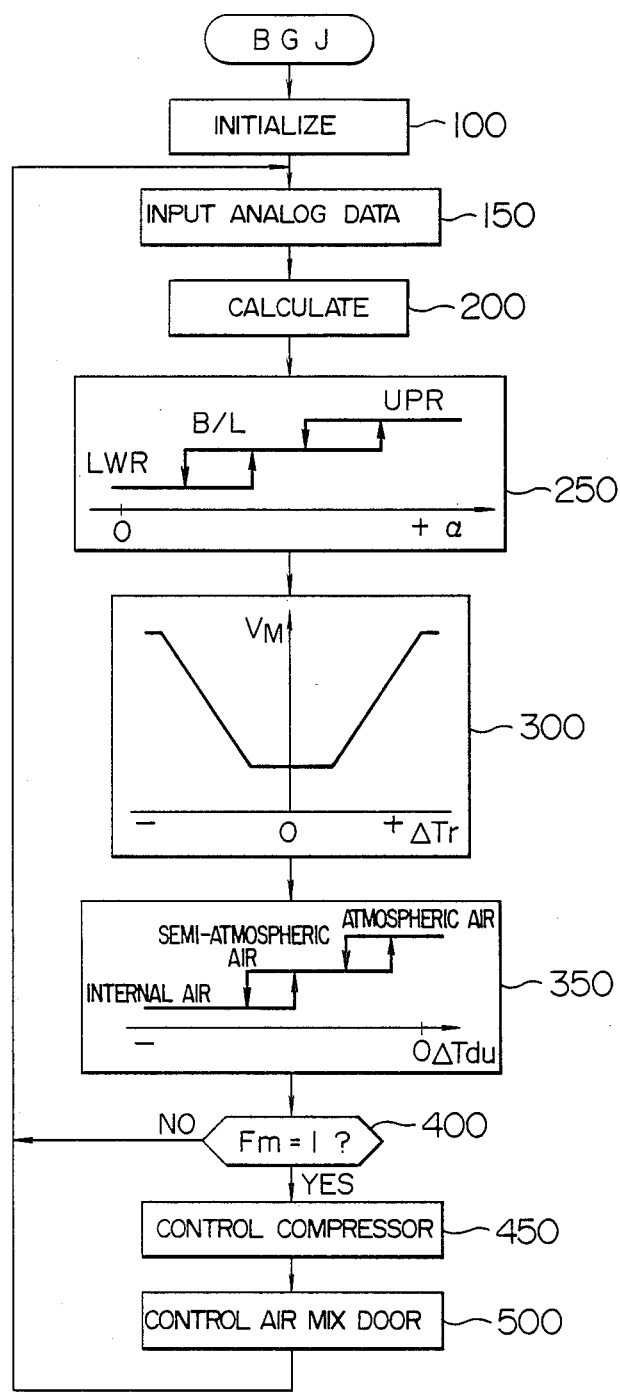
FIG. 2 is a flowchart of a background job (BGJ) stored in a microcomputer of the air-conditioning apparatus for automobiles.
Figure 3:
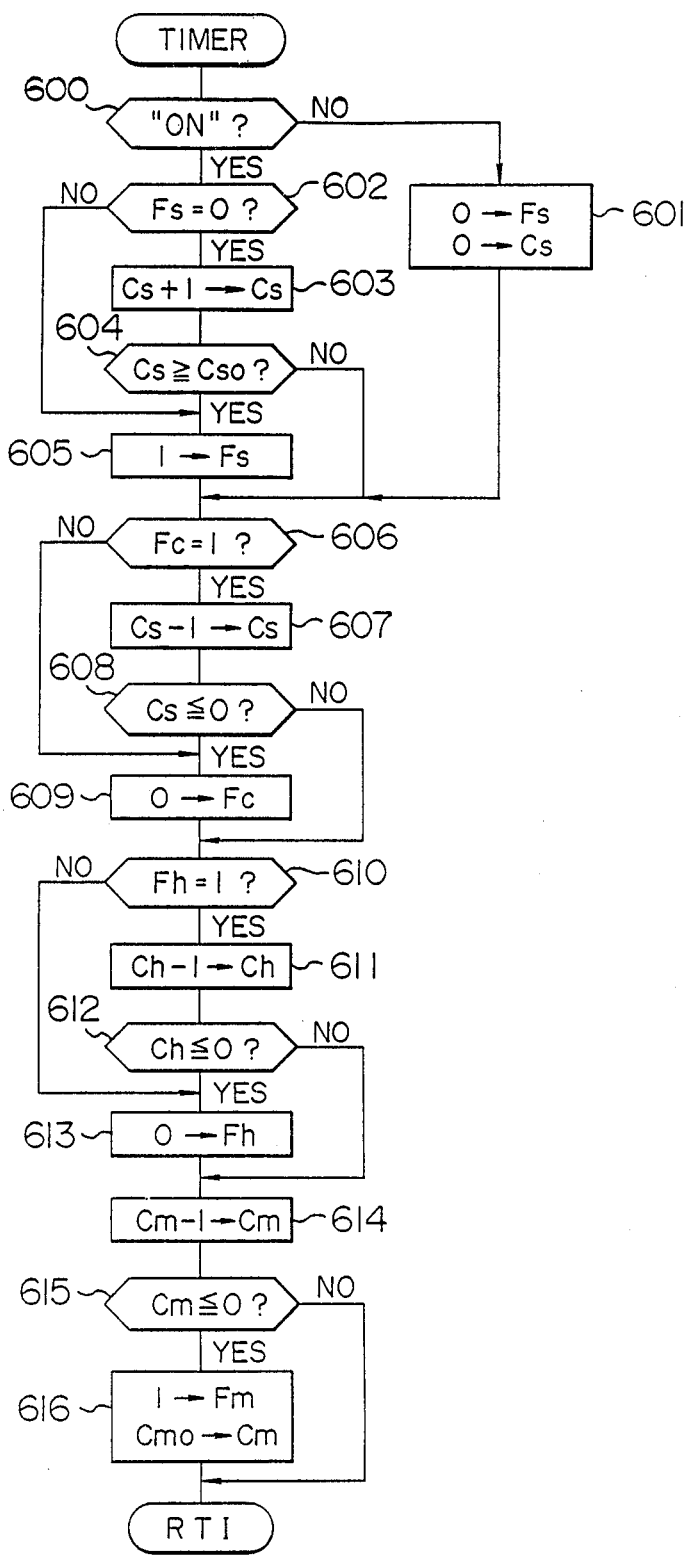
FIG. 3 is a flowchart of timer processing as an interrupt process in the program of FIG. 2.

The program is divided into a background job (BGJ) as shown in FIG. 2 which is repeated at regular intervals of about 100 milliseconds, and a time processing (TIMER) as shown in FIG. 3 which in executed as by suspending and interrupting the BGJ at predetermined time intervals (5 milliseconds in the case under consideration) by a counter operating independently of the program through the time interrupt function of the microcomputer 28.

In the timer processing, the time is measured by counting the number of times the timer processing is conducted, and a flag is monitored at intervals of several seconds or a prepared counter is incremented or decremented at predetermined time intervals, thereby measuring the required time of the job at regular intervals of time.

At the end of the TIMER, the BGJ restarts the processes following the suspended job. The numerals for each block of the flow chart designate step numbers.

Step 100 in FIG. 2 sets the output terminal of the I/O of the microcomputer 28 in such a manner as to de-energize the external devices, and reduces to zero all the flags (Fs, Fc, Fn and Fm) for storing "0" and "1" and counters (Cs, Co, Ch and Cm) for storing numerals. Specifically, the microcomputer 28 is initialized before starting the control process.

Step 150 converts into digital amounts the signal voltages of the atmospheric air temperature sensor 40 making up means for detecting the atmospheric air temperature, the internal air temperature sensor 41 making up means for detecting the internal air temperature, a defroster duct temperature sensor 42, a ventilator duct temperature sensor 43, a floor duct temperature sensor 44, an evaporator outlet temperature sensor 45 making up means for detecting the cooling air temperature, a sunlight sensor 36 and a temperature setting VR 37 making up means for setting an internal air temperature target. Further, the signal voltages, temperatures and conversion characteristic of the sunlight amount stored in the microcomputer 28 are used to determine the atmospheric air temperature Ta, the internal air temperature Tr, the defroster duct temperature Tdd, the ventilator duct temperature Tdu, the floor duct temperature Tdl, the evaporator outlet air temperature Tc, the sunlight amount Am and the set temperature Ts. The sunlight amount is expressed in kcal/m²h.

Step 200 makes the calculations described below.

A target cabin temperature Tso is calculated as $$Tso = -Kas \cdot Ta + Kss \cdot Ts - Kos \quad (1)$$

where Kas, Kss and Kos are constants.

The deviation ΔTr of the internal air temperature Tr from a target value is determined from $$\Delta Tr = Ksr \cdot Tso - Krr \cdot Tr + Kor \quad (2)$$

where Ksr, Krr and Kor are constants.

The target blowdown temperatures Tdod (at defroster blowdown outlet 25), Tdou (at ventilator blowdown outlet 26) and Tdol (at floor blowdown outlet 7) expressed by Tdox collectively representing the suffixes d, v and l thereof are given as $$Tdox = Kbx \cdot Tdbx - Kzx \cdot Zm + Ksx \cdot Ts - Kpx \, Tr + Kox \quad (3)$$

The value Tdod is determined by replacing the x in equation (3) with d. In similar fashion, Tdou is given by regulating x with u and Tdol by replacing x with l. Kbx, Kzx, Ksx, Kpx and Kox are constants. Tdbx is a symbol representing the reference blowdown temperature Tdbd giving a comfort (at defroster blowdown outlet 25), Tdbu (at ventilator blowdown outlet 26) and Tdbl (at floor blowdown outlet 27) respectively.

Figure 6:
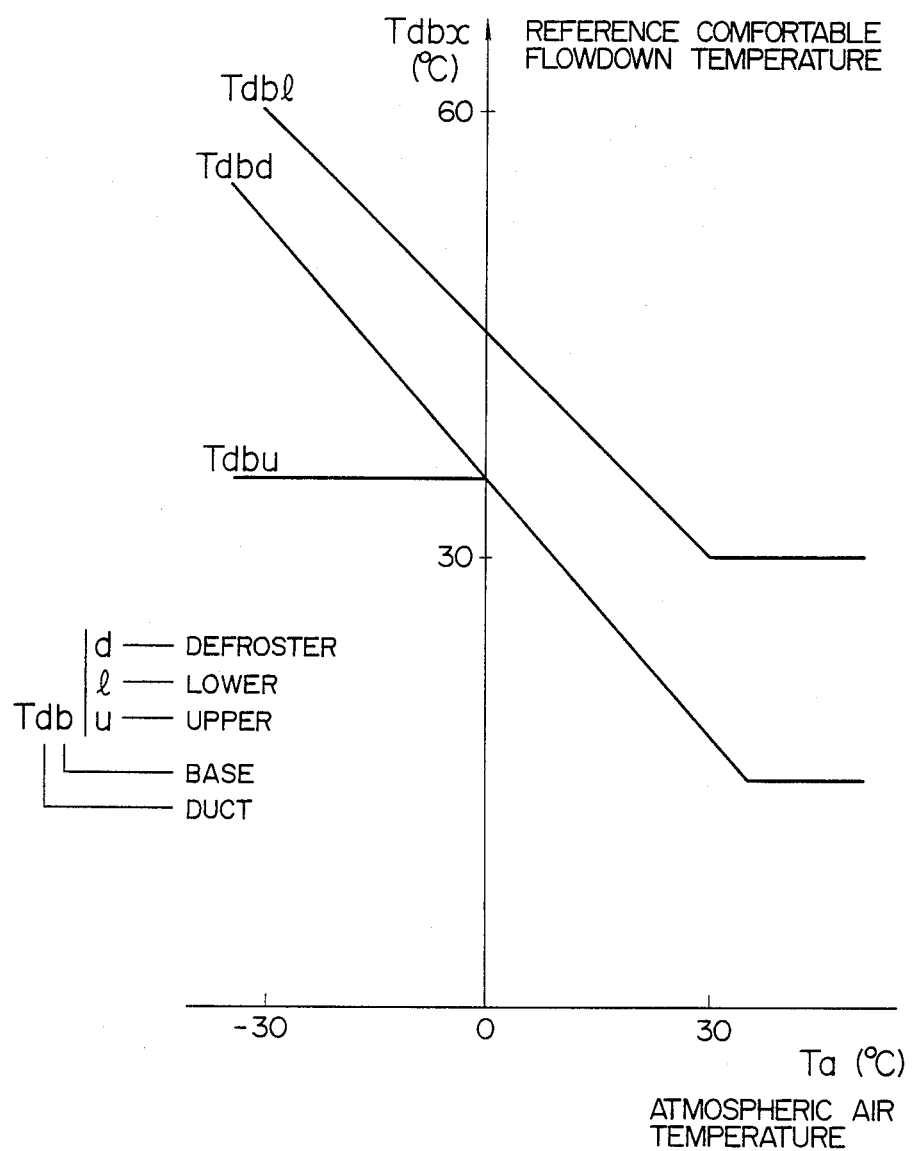
FIG. 6 is a diagram showing a reference blowdown temperature characteristic stored in the microcomputer shown in FIG. 1 and used for calculation in the flowchart of FIG. 4.

These reference blowdown temperature characteristics shown in FIG. 6 are predetermined by experiments according to the vehicle construction and are stored in memory.

By replacing x with d, v or l respectively, the comfortable blowdown temperature at each blowdown outlet is given. The constants in the equations are values predetermined experimentally for each type of vehicle.

The difference ΔTdx between the target blow-down temperature Tdox at each blowdown outlet 25, 26 or 27 and the detected blowdown temperature Tdx representing the defroster duct temperature Tdd, ventilator duct temperature Tdu and the floor duct temperature Tdl respectively is given as $$Tdx = Kbu \cdot Tdox - Kuu \cdot Tdx + Kdu \quad (4)$$

where Kbu, Kuu and Kdu are constants. Also, in the upper mode (UPR) where the entire blowdown is from the ventilator blowdown outlet 26, though no air blown out of the floor blowdown outlet 27, the temperature data for the floor blowdown outlet is constantly required for producing a control signal, and therefore as shown by equation (5), the floor blowdown outlet temperature difference ΔTdl is replaced by the ventilator blowdown temperature difference Tdv.

$$\Delta Tdl = \Delta Tdu \quad (5)$$

In the lower mode (LWR) where blowdown is caused from the defroster blowdown outlet 25 and the floor blowdown outlet 27, on the other hand, values are replaced like in equation (5) regarding the ventilator blowdown outlet 26 not venting any air, as shown below.

$$\Delta Tdu = \Delta Tdd \quad (6)$$

in such a manner not to use the temperature of a blowdown outlet not supplying air as it is.

At the same time, the signal $\alpha$ for controlling the air blowdown outlets is calculated from $$\alpha = Kam \cdot Ta + Kzm \cdot Zm - Ksm \cdot Ts + Kom \quad (7)$$

where Kam, Kzm, Kam and Kom are constants.

Step 250 determines the blowdown outlets 25 to 27 to be used in accordance with the graph shown in step 250 on the basis of the equation (7) in step 200, thereby producing a signal to the door driving circuit 35.

Step 300 determines the voltage to be applied to the motor 8 by the value $\Delta Tr$ determined from the equation (2) in step 200 thereby to apply a signal to the blower control circuit 9.

Step 350 determines the internal and atmospheric air intake ports 4 and 5 on the basis of the graph shown in step 350 from the value $\Delta Tdu$ determined with x replaced by in equations (7) and (8) in step 200. The value $\Delta Tdu$ is used because the minimum comfortable blowdown temperature providing a reference is the ventilator blowdown temperature as shown in FIG. 6,.

Step 400 decides whether the flag Fm indicating whether an execution permit for temperature control is set or not, and if it is set, the flag Fm is cleared, followed by step 450, while if the answer is "No", the process returns to step 150.

Figure 4:
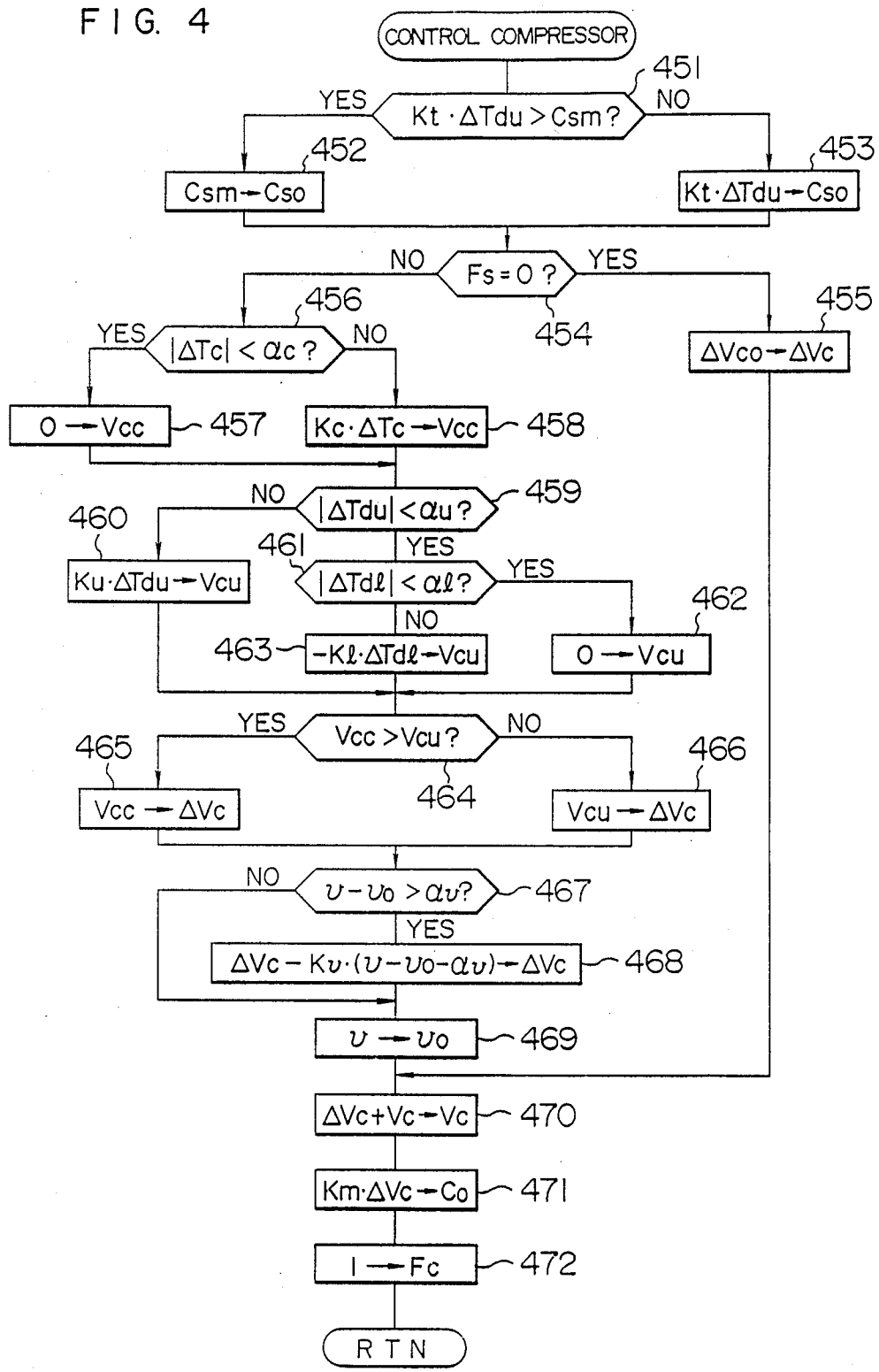
FIG. 4 is a detailed flowchart of compressor control in the flowchart shown in FIG. 2.
Figure 5:
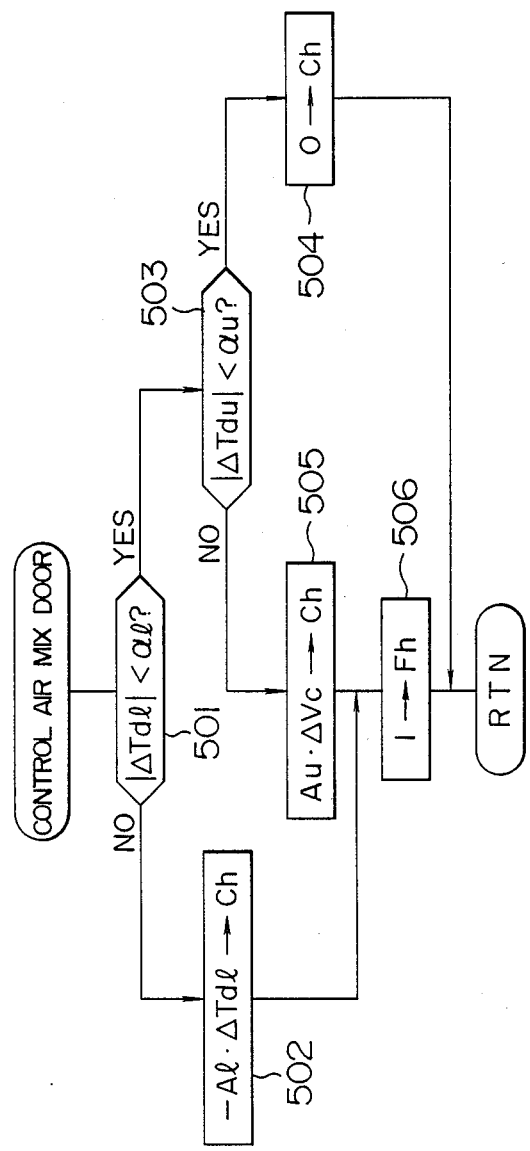
FIG. 5 is a detailed flowchart of air mix control in the flowchart of FIG. 4.

Step 450 controls the compressor. A detailed flowchart for compressor control is shown in FIG. 4. Step 451 decides whether $Kt \cdot \Delta Tdu$ (Kt: Constant) representing the degree of unnecessity of cooling capacity is larger than a predetermined value Csm. If the answer is "Yes", that is, the $Kt \cdot \Delta Tdu$ is larger than Csm, step 452 sets the small-capacity operation time Cso of the compressor to the upper limit Csm, while if the answer is "No", that is, if $Kt \cdot \Delta Tdu$ is smaller than Csm, step 453 sets Cso to $Kt \cdot Tdu$ (lower limit at 0). Step 454 decides whether the compressor small-capacity operation cancellation flag Fs is set or not. If the answer is "Yes", that is, when the flag Fs is not set, step 455 gives a small-capacity indication signal amount $\Delta Vco$ to the capacity change rate $\Delta Vc$, followed by step 470. If the answer is "No", that is, if the compressor small-capacity cancellation flag Fs is set, the process proceeds to step 456.

Step 456 decides whether the absolute value of the difference $\Delta Tc$ ($= Tco - Tc$) between a predetermined outlet target temperature Tcc (say, 3° C.) and the detected outlet temperature Tc of the evaporator 11 as air cooling means is smaller than a predetermined value $\alpha c$. If the answer is "Yes", that is, the former is smaller than the latter, step 457 decides that the capacity is not required to be changed for prevention of freezing and reduces the capacity change Vcc by the evaporator 11 to zero, while if the answer is "No", that is, if the absolute value of $\Delta Tc$ is larger than the predetermined value $\alpha c$, on the other hand, it is decided that the capacity is required to be changed for freezing prevention, so that step 458 sets Vcc to $Kc \cdot \Delta Tc$ (Kc: Constant).

Then, step 459 decides whether the absolute value of $\Delta Tdu$ is smaller than the predetermined value $\alpha u$, and if the answer is "No", step 460 sets the capacity change Vcu depending on the blowdown temperature to $Ku \cdot \Delta Tdu$ (Ku: Constant). If the answer is "Yes", that is, if the absolute value of $\Delta Tdu$ is smaller than $\alpha u$, on the other hand, step 461 for checking the temperature difference at the floor blowdown outlet highest in temperature of all the reference comfortable blowdown temperatures decides whether the absolute value of $\Delta Tdl$ is smaller than a predetermined value $\alpha 1$. If the answer is "Yes", that is, if the former is smaller than the latter, it is decided that each blowdown outlet is controlled at a target blowdown temperature, so that Vcu is reduced to zero at step 462. If the answer is "No", that is, if the absolute value of $\Delta Tdl$ is larger than $\alpha 1$, by contrast, the cooling air blowdown outlet (the ventilator blowdown outlet 26 in upper or by-level mode or the defroster blowdown outlet 25 under lower mode) is controlled to a target blowdown temperature, while the warm air blowdown outlet (the floor blowdown outlet 27 in lower or by-level mode) deviates from the target value, and the air mix door 9 is driven. In view of this, step 463 sets Vcu to $-K1 \cdot Tdl$ (K1: Constant) to compensate for the cooling capacity.

The process then proceeds to step 464 to decide whether the value Vcc is larger than Vcu or not. If the answer is "Yes", that is if Vcc is larger than Vcu, step 465 sets the capacity change rate $\Delta Vc$ to Vcc giving priority to the freezing prevention, while if the answer is "No", that is, if Vcc is smaller than Vcu, step 466 sets the value Vcu required for blowdown temperature control to $\Delta Vc$.

The process then proceeds to step 467 to decide whether the change $v - v0$ of the vehicle speed (v0: Vehicle speed previously detected) detected by the speed sensor 38, that is, the acceleration exceeds a predetermined value $\alpha v$. If the answer is "Yes", that is, the former exceeds the latter, the value $\Delta Vc$ is subjected to the compensation at step 468 in order to improve the acceleration characteristic by using the engine torque for drive. Specifically, the value $\Delta Vc - Kv \cdot (v - v0 - \alpha v)$ is set to a new $\Delta Vc$. If the answer is "No", that is, when the acceleration is not more than the predetermined value $\alpha v$, the process proceeds to step 469 deciding that the accelerability need not be improved.

If the compensation at step 468 is primarily intended for improving the accelerability, the value $\Delta Vc$ provides a compensation amount for acceleration, and therefore step 468 calculates the capacity change rate $\Delta Vc$ for reducing the compressor capacity on the basis of the output signal $v - v0$ of the speed sensor 38 and the compensation amount $\Delta Vc$.

Step 469 replaces the vehicle speed presently detected with the previous detection v0. Step 470 add the value $\Delta Vc$ to the voltage Vc applied to the capacity actuator 13 in the process of producing an output, and produces a new Vc.

Steps 471 and 472 are processes for replacing the step 470 in the case where the capacity actuator 13 is driven stepwise. Step 471 determines the time of voltage application Co to the capacitor actuator 13 with $Km \cdot \Delta Vc$ (Km: Constant) as Co, and applies the particular voltage. Step 472 sets the flag Fc indicating the voltage application.

Returning to FIG. 2, after compressor control at step 450, the process proceeds to step 500 for air mix door control. The air mix door control at step 500 is shown in detail in FIG. 5. Step 501 decides whether the absolute value of $\Delta Tdl$ is smaller than the predetermined value $\alpha 1$ or not. If the answer is "No", that is, when the former is larger than the latter, it is decided that the warm air has not reached a target value, and step 502 determines the time Ch of voltage application to the door drive circuit 34 with $-Al \cdot \Delta Tdl$ (Al: Constant) as Ch, and applies the particular voltage. If the answer is "Yes", that is, if the absolute value of $\Delta Tdl$ is smaller than $\alpha l$, step 503 decides whether the absolute value of $\Delta Tdu$ is smaller than the predetermined value $\alpha u$. If the answer is "Yes", that is, if the former is smaller than the latter, it is decided that each blowdown outlet is controlled at a target blowdown temperature, and the value Ch is reduced to zero at step 504. If the answer is "No", on the other hand, that is, when the absolute value of $\Delta Tdu$ is larger than $\alpha u$, the warm air blowdown outlet (floor blowdown outlet 27) is controlled to a target temperature, but due to the change in the capacity of the compressor 12, step 505 compensates for the heating amount with Ch as $Au \cdot \Delta Vc$ (Au: Constant). Then, step 506 applies a voltage to the door drive circuit 34, setting the flag Fn indicating that a voltage is being applied.

In FIG. 2 at the end of step 500, the process is returned to step 150 repeatedly.

In the process of executing the abovementioned steps, the process by TIMER shown in FIG. 3 is executed at regular intervals of time. The process by TIMER is not explained. The main processes include measurement of the time of voltage application to each actuator and the flag control associated therewith.

In FIG. 3, step 600 decides whether a switch 31 is turned on to give instruction to actuate the air conditioning system. If the answer is "No", that is, the switch 31 is off, step 601 clears the compressor small-capacity cancel flag Fs, and reduces to zero the counter Cs for measuring the small-capacity operation time of the compressor. As a result, preparations are made to start the air-conditioning system from a small capacity when instructed to operate. If the air-conditioning system can be started at a small capacity, the torque change of the engine is kept small. If the answer is "Yes", that is, the switch 31 is on, step 602 decides whether the compressor small-capacity cancel flag Fs is set or not, and if the answer is "Yes", step 603 counts up the small-capacity time counter Cs. Step 604 decides whether the value Cs is more than the small capacity time Cso, and if the answer is "Yes", step 605 cancels the small-capacity control by setting the flag Fs.

If it is decided that Cs is smaller than Cso, that is, the answer is "No" at step 604, after the flag Fs is set at step 605, step 606 sets the flag Fc indicating that a voltage is being applied, while at the same time deciding whether the capacity actuator 13 is being driven or not. If the answer is "Yes", step 607 counts down the time Cs of voltage application to the capacity actuator 13. Step 608 decides whether the value Cs is below zero and whether the time has come to stop the capacity actuator 13 or not. If the answer is "Yes", step 609 clears the flag Fc, and applies the step signal of the capacity actuator 13 to the compressor control circuit 16.

If the answer is "No" at step 608, that is, if the value Cs is more than zero, or after step 609 clears the flag Fc, then step 610 sets the flag Fh indicating the voltage application while deciding whether the power actuator 18 is being driven. If the answer is "Yes", step 611 counts down the time Ch of voltage application to the door drive circuit 34. Step 612 decides whether the value Ch has been reduced below zero and the time has come for the power actuator 18 to be stopped. If the answer is "Yes", step 613 clears the flag Fh and applies the stop signal of the power actuator 18 to the door drive circuit 34.

If the answer is "No" at step 612, that is, if the value Ch is more than zero, or after step 613 clears the flag Fh, step 614 counts down the counter Cm for preparing the execution cycle of temperature control. Step 615 decides whether Cm has been reduced below zero and whether the time has come to permit the execution. If the answer is "Yes", step 616 sets the value Fm and gives an execution cycle Cmo to the value Cm.

As explained above, according to the present embodiment, the apparatus comprises a defroster duct temperature sensor making up means for detecting the temperature of the air blowdown into the cabin, a ventilator temperature sensor 43 and the floor duct temperature sensor 44, and a target blowdown temperature Tdox at each blowdown outlet is calculated from the output signals of the internal air temperature sensor 41 making up the internal temperature detection means, the atmospheric air temperature sensor 40 making up the atmospheric air temperature detection means and the temperature setting VR 37 making the internal air temperature target setting means (See equation (3)) at step 200 shown in FIG. 2. Step 200 also calculates the temperature difference $\Delta Tdx$ between the target blowdown temperature Tdox and the output signals of the blowdown temperature detection means 42, 43 and 44 (See equation (4)). Steps 459 to 463 shown in FIG. 4 calculates the capacity change rate Vcu of the compressor 12 from the temperature difference $\Delta Tdx$ thereby to determine the compensation amount $\Delta Vc$ for the compressor capacity, in such a case, the compensation amount Vcu is calculated on the basis of the temperature difference $\Delta Tdu$ between the lowest target blowdown temperature Tdou of all the blowdown outlets in use where from air is being blown, and therefore, the compensation amount Vcu is thus calculated on the basis of the temperature difference between the target value and detection value at a ventilator blowdown outlet 26 or the defroster blowdown outlet 25 associated with the lowest target blowdown temperature thereby to control the compressor capacity. It is thus possible to control the capacity to minimum for a comfortable blowdown temperature at all blowdown outlets, thereby minimizing the energy consumption due to the driving of the compressor.

At step 463 shown in FIG. 4, in particular, the blowdown temperature is controlled taking into consideration the mutual effect between the compressor output capacity and the air mix door position, and therefore the comfortable blowdown temperature is subjected to detailed control for all blowdown outlets.

Step 400 shown in FIG. 2 and steps 614 to 616 shown in FIG. 3 carry out the capacity control in synchronism with the flag Fm set in predetermined cycles, so that it is possible to control the capacity at regular intervals of time, and the delay of thermal transmission in cooling the air at the evaporator 11 is absorbed, thus effecting the capacity control at a blowdown temperature reflecting the previous control result. As a consequence, the capacity of the compressor 12 is controlled in stable manner.

Further, according to the present embodiment, step 468 shown in FIG. 4 controls the rate of reduction of the compressor capacity on the basis of the output signal $v - v0$ of the speed sensor 38 making up acceleration detection means a compensation amount $\Delta Vc$ determined by the temperature difference $\Delta Tdx$. In the process, if the required cooling capacity is larger than a predetermined value, a compensation amount is determined in such a manner as to reduce the rate of acceleration improvement. As a result, the reduction in comfort is reduced, and therefore the compressor capacity is regulated while taking a balance between the internal comfort and the automotive acceleration characteristic, thereby improving the comfort quality as a whole.

Furthermore, according to the present embodiment, as described above, the compressor capacity is controlled in synchronism with the flag Fm set in a predetermined cycle, and therefore the compressor capacity is controlled in such cycles as the response delay of refrigeration cycles is taken into account on the basis of the outlet air temperature of the evaporator 11 and a target temperature. As a result, the temperature difference is calculated to readjust the capacity a predetermined time after control of the compressor capacity in a cycle, so that the compressor capacity is controlled at such an evaporator outlet temperature as reflecting the result of previous capacity control, thereby assuring stable compressor capacity regulation.

I claim:

1. An air-conditioning apparatus for automobiles, comprising:
   means for sucking in air and guiding said air to an air blowdown outlet open to a cabin of an automobile;
   means for cooling the air sucked in including a variable capacity compressor operatively connected in a refrigeration circuit;
   means for heating the air sucked in;
   first control means interposed between said cooling means and heating means for controlling the amount of the sucked in air proceeding to the heating means;
   means for detecting the internal air temperature representing the interior of the cabin of an automobile;
   means for detecting the atmospheric air temperature;
   means for detecting the air blowdown temperature at said air blowdown outlet into the cabin;
   means for setting a target value of said internal air temperature;
   means for calculating a target value of the air blowdown temperature from the output signals of the internal air temperature detection means, the atmospheric air temperature detection means and the internal air temperature target value setting means;
   means for calculating a compensation amount of the compressor capacity from the difference between the target air blowdown temperature and the output signal of the air blowdown temperature detection means; and
   second control means for controlling the compressor capacity on the basis of the output of said calculation means.

2. An air-conditioning apparatus for automobiles, comprising:
   means for sucking in air and guiding said air to a plurality of air blowdown outlets open to a cabin of an automobile;
   means for cooling the air sucked in including a variable capacity compressor operatively connected in a refrigeration circuit;
   means for heating the air sucked in;
   first control means interposed between said cooling means and said heating means for controlling the amount of the sucked-in air proceeding to the heating means;
   means for detecting the internal air temperature representing the temperature in the interior of the cabin of an automobile;
   means for detecting the atmospheric air temperature;
   means for detecting the air blowdown temperature at each of the plurality of air blowdown outlets;
   means for determining an air blowdown outlet in operation;
   means for setting a target value of the internal air temperature;
   means for calculating a target value of the air blowdown temperature for each air blowdown outlet from the output signals of said internal air temperature detection means, said atmospheric air temperature detection means and said internal air temperature target setting means;
   means for calculating a compensation amount for the compressor capacity from the difference between the lowest target air blowdown temperature of the blowdown outlet in operation as determined by said blowdown outlet determining means and the output signal of the blowdown temperature detection means for said blowdown outlet in operation; and
   second control means for controlling the compressor capacity on the basis of the output of said calculation means.

3. An apparatus according to claim 1, wherein said second control means includes means for controlling the compressor capacity in predetermined cycles.

4. An apparatus according to claim 2, wherein said second control means includes means for controlling the compressor capacity in predetermined cycles.

5. An apparatus according to claim 1, further comprising means for detecting the acceleration of an automobile, said calculation means including means for calculating a new compensation amount for the compressor capacity on the basis of said preceding compensation amount and the output signal of said acceleration detection means.

6. An apparatus according to claim 2, further comprising means for detecting the acceleration of an automobile, said calculation means including means for calculating a new compensation amount for the compressor capacity on the basis of said preceding compensation amount and the output signal of said acceleration detection means.

7. An apparatus according to claim 3, further comprising means for detecting the air temperature at the outlet of said cooling means and means for setting a target value of the air temperature at said outlet,
   said calculation means further including means for comparing the difference between the output signals of the means for setting the target value at the outlet of the cooling means and the means for detecting the air temperature at said outlet with a predetermined value; and means for calculating a new compensation amount of said compressor capacity on the basis of the result of said comparison.

8. An apparatus according to claim 1, further comprising means for comparing the difference between the output signal of said blowdown temperature detection means at said air blowdown outlet and the output signal of the target air blowdown temperature setting means at said blowdown outlet with a predetermined value; and
   third control means for controlling the output of said first control means on the basis of the result of said comparison.

9. An apparatus according to claim 2, further comprising means for comparing the difference between the output signal of said blowdown temperature detection means at said air blowdown outlet in operation and the output signal of the target air blowdown temperature setting means at said blowdown outlet operation with a predetermined value; and
    third control means for controlling the output of said first control means on the basis of the result of said comparison.

10. An apparatus according to claim 3, further comprising means for comparing the difference between the output signal of said blowdown temperature detection means at said air blowdown outlet and the output signal of said target air blowdown temperature setting means at said blowdown outlet with a predetermined value and third control means for controlling the output of said first control means on the basis of the result of said comparison.

11. An apparatus according to claim 4, further comprising means for comparing the difference between the output signal of said blowdown temperature detection means at said air blowdown outlet in operation and the output signal of said target air blowdown temperature setting means at said blowdown outlet in operation with a predetermined value, and third control means for controlling the output of said first control means on the basis of the result of said comparison.

12. An apparatus according to claim 5, further comprising means for comparing the difference between the output signal of said blowdown temperature detection means at said air blowdown outlet and the output signal of said target air blowdown temperature setting means at said blowdown outlet with a predetermined value, and third control means for controlling the output of said first control means on the basis of the result of said comparison.

* * * * *